United States Patent
Puthillathe

(10) Patent No.: US 10,003,661 B2
(45) Date of Patent: Jun. 19, 2018

(54) SYSTEM AND METHOD FOR SERVICE DISCOVERY IN A LARGE NETWORK

(71) Applicant: DELL PRODUCTS, LP, Round Rock, TX (US)

(72) Inventor: Chandrasekhar Puthillathe, Bangalore (IN)

(73) Assignee: DELL PRODUCTS, LP, Round Rock, TX (US)

(*) Notice: Subject to any disclaimer, the term of this patent is extended or adjusted under 35 U.S.C. 154(b) by 193 days.

(21) Appl. No.: 15/180,550

(22) Filed: Jun. 13, 2016

(65) Prior Publication Data
US 2017/0359425 A1  Dec. 14, 2017

(51) Int. Cl.
G06F 15/16 (2006.01)
H04L 29/08 (2006.01)
H04L 29/12 (2006.01)

(52) U.S. Cl.
CPC .......... *H04L 67/16* (2013.01); *H04L 61/6068* (2013.01)

(58) Field of Classification Search
CPC .................. H04L 61/6068; H04L 67/16
See application file for complete search history.

(56) References Cited

U.S. PATENT DOCUMENTS

| 7,457,868 | B1 | 11/2008 | Guo | |
|---|---|---|---|---|
| 2007/0250590 | A1* | 10/2007 | Flannery | H04L 12/66 709/217 |
| 2010/0315972 | A1* | 12/2010 | Plotnik | H04L 67/16 370/254 |
| 2013/0038897 | A1* | 2/2013 | Heckler | H04L 67/16 358/1.15 |
| 2014/0244996 | A1* | 8/2014 | Parthasarathy | H04L 63/104 713/150 |
| 2015/0207746 | A1 | 7/2015 | Clemm et al. | |
| 2016/0072678 | A1* | 3/2016 | Dong | H04L 67/16 370/254 |

* cited by examiner

*Primary Examiner* — Bryan Lee
(74) *Attorney, Agent, or Firm* — Larson Newman, LLP

(57) ABSTRACT

Service discovery is accomplished across a network with reduced traffic. Network devices often receive multicast discovery requests for various protocols and/or services, which increase network traffic and degrade network performance. Here, though, a server maintains a membership list for a particular protocol. The server populates the membership list with subnet devices that confirm the particular protocol. Whenever the server receives a discovery request associated with the protocol, the server need not clog its subnet with multicast requests. Instead, the server need only retrieve the membership list that is associated with the protocol. The membership list contains the subnet addresses assigned to the subnet devices that confirm the particular protocol.

20 Claims, 14 Drawing Sheets

SYSTEM AND METHOD FOR SERVICE DISCOVERY IN A LARGE NETWORK

FIELD OF THE DISCLOSURE

The present disclosure generally relates to information handling systems, and more particularly relates to service discovery in a large network.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Service discovery is accomplished across a network with reduced traffic. An information handling system maintains membership lists for different protocols. The information handling system populates the membership list with subnet devices that confirm a particular protocol. Whenever the information handling system receives a discovery request associated with a protocol, the information handling system need not clog a subnet with multicast requests. That is, the information handling system need not fan out or propagate requests across the subnet to determine which network devices respond to the protocol. Instead, the information handling system need only retrieve the membership list that is associated with the protocol. The membership list contains the subnet addresses assigned to the subnet devices that confirm the particular protocol. The information handling system thus merely responds with the membership list that is associated with the protocol, thus reducing packet traffic and improving network performance.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
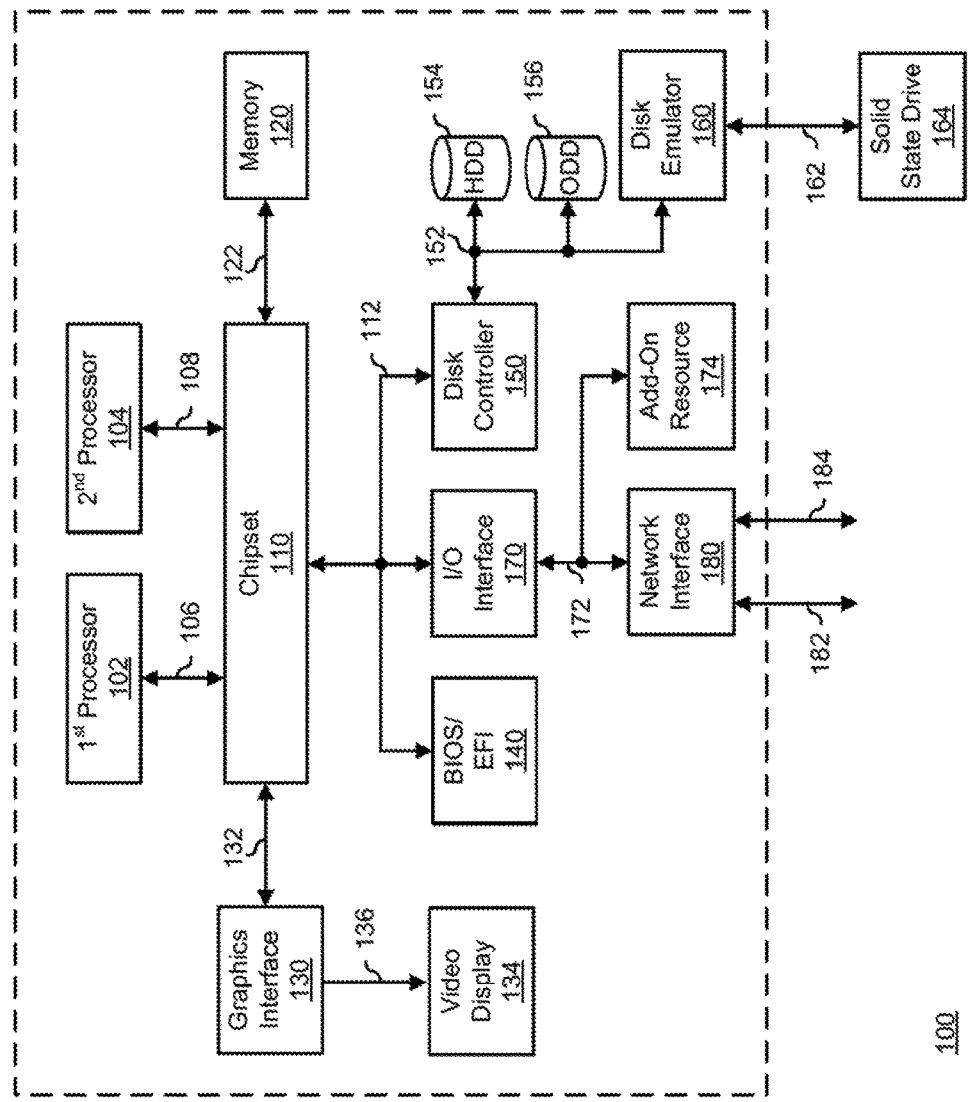
FIG. 1 is a block diagram illustrating an information handling system according to an embodiment of the present disclosure.
Figure 2:
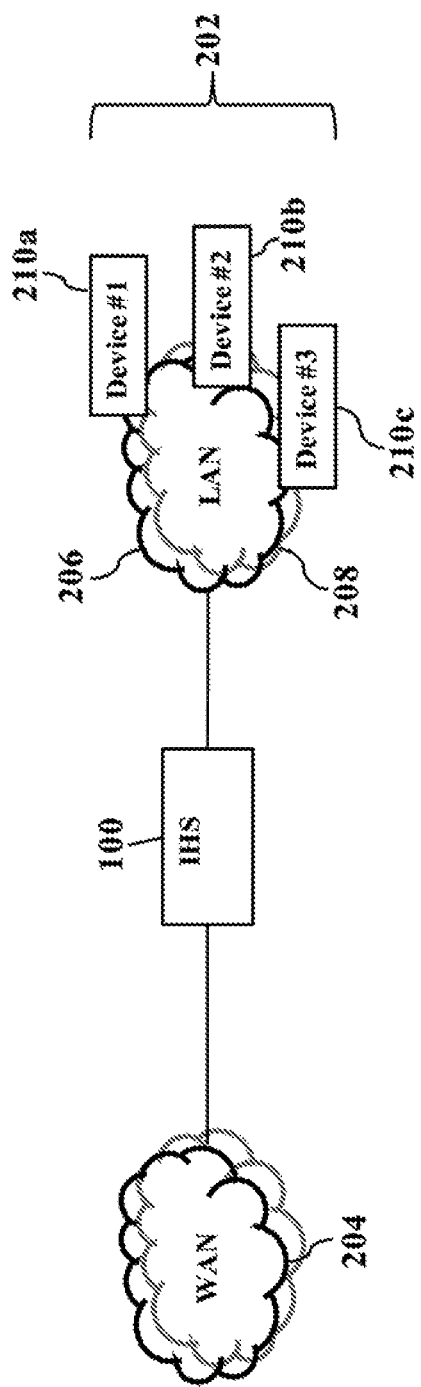
FIGS. 2-5 are illustrations of a system for service discovery, according to exemplary embodiments.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniB and channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

FIGS. 2-5 are illustrations of service discovery, according to exemplary embodiments. Here the information handling system (IHS) 100 connects to, or communicates with, a wide area network (WAN) 204 (such as the Internet). The information handling system 100 also connects to, or communicates with, multiple networked devices 202 via a local area network (LAN) 206. While FIG. 2 only illustrates three (3) devices 202 in the local area network 206, in actual practice the information handling system 100 may wiredly or wirelessly interconnect with many devices. The information handling system 100 thus communicates via a subnetwork (subnet) 208 with the devices 202, and each device 202 may be assigned a unique subnet address 210a-c. As networking topologies are well known, a more detailed explanation is unnecessary.

Figure 3:
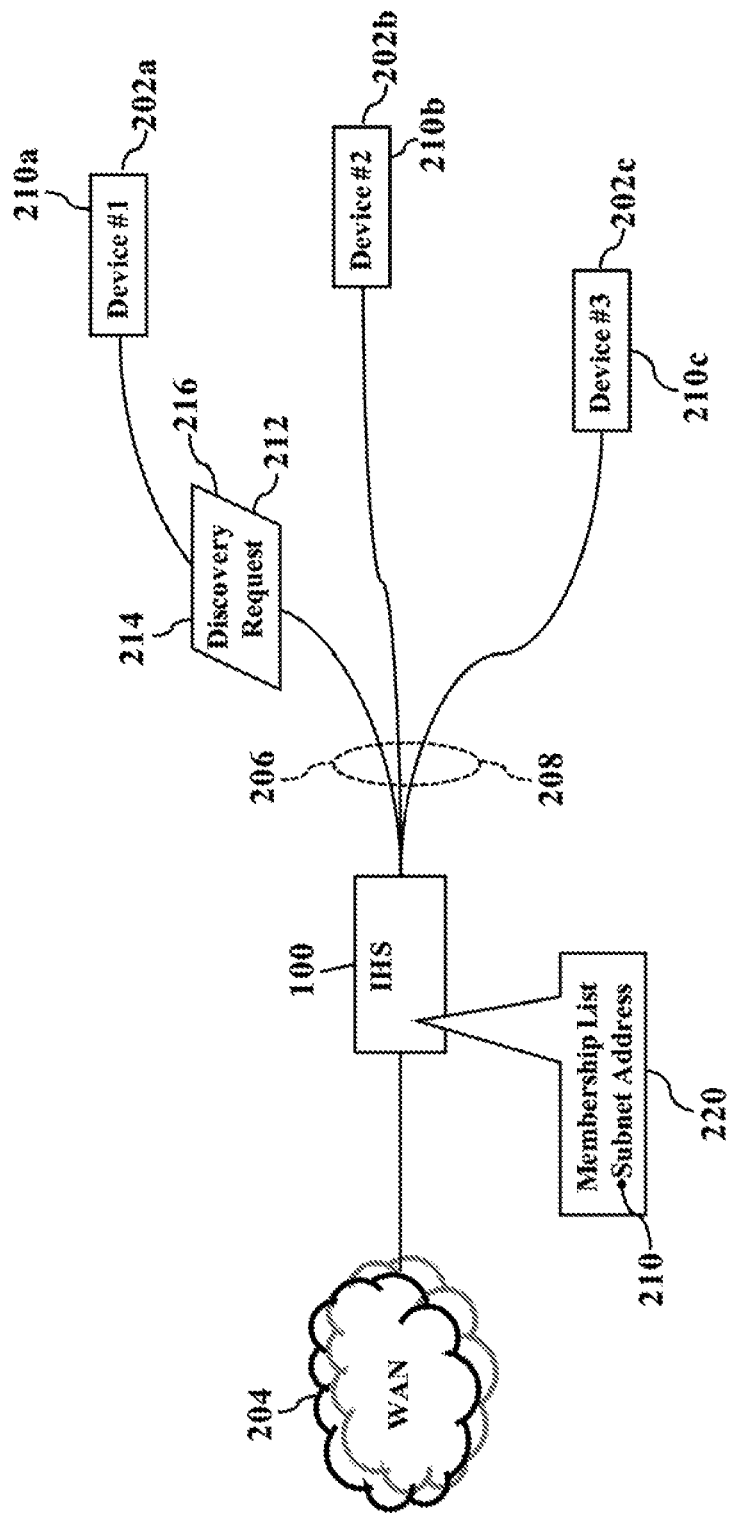

FIG. 3 illustrates a discovery request 212. While the discovery request 212 may originate from any device, FIG. 3 illustrates intra-subnet origination. That is, suppose the discovery request 212 is sent by one of the devices 202a connected to the subnet 208 and assigned the subnet address 210a. The discovery request 212 specifies a protocol 214 associated with a service 216. The discovery request 212 requests that the information handling system 100 determine the other devices (such as 210b and 210c) in the local area network 206 or subnet 208 that respond to, recognize, or understand the same protocol 214 or the same underlying service 216. The discovery request 212, in other words, seeks to learn what other devices acknowledge or confirm the same protocol 214. While the discovery request 212 may specify any protocol, for simplicity the protocol 214 will be mainly described in terms of the REDFISH® standard that uses the Representational State Transfer (REST) architecture interface to perform remote out of band systems management. Again, though, exemplary embodiments are applicable to any protocol or service.

Conventional discovery clogs networks. When the information handling system 100 receives the discovery request 212, the information handling system 100 would conventionally distribute the discovery request 212 into the local area network 206. The information handling system 100, in other words, may multicast the discovery request 212 to each subnet address 210a-c in the subnet 208. The information handling system 100 may even conventionally forward the discovery request 212 into the wide area network 204 (such as the Internet) for additional discovery. The discovery request 212, in other words, may conventionally fan out and propagate throughout the local area network 206 and even the Internet to discover the endpoint devices that understand the REDFISH® standard. Because the discovery request 212 is conventionally multicasted to so many destinations, the subnet 208 becomes clogged with messages and network performance degrades.

Exemplary embodiments, though, reduce network traffic. Here the information handling system 100 checks for a membership list 220 associated with the protocol 214. The membership list 220 is populated with the subnet addresses 210 associated with the devices 202 that are known to have already confirmed their participation in the protocol 214. The membership list 220, for example, is pre-populated with the subnet addresses 210 associated with the networked devices 202 that respond to the REDFISH® protocol 214. Each one of the REDFISH®-capable devices 202 also wiredly or wirelessly communicates with the information handling system 100 via the local area network 206. The information handling system 100 thus retrieves the membership list 220 that corresponds to the protocol 214.

Figure 4:
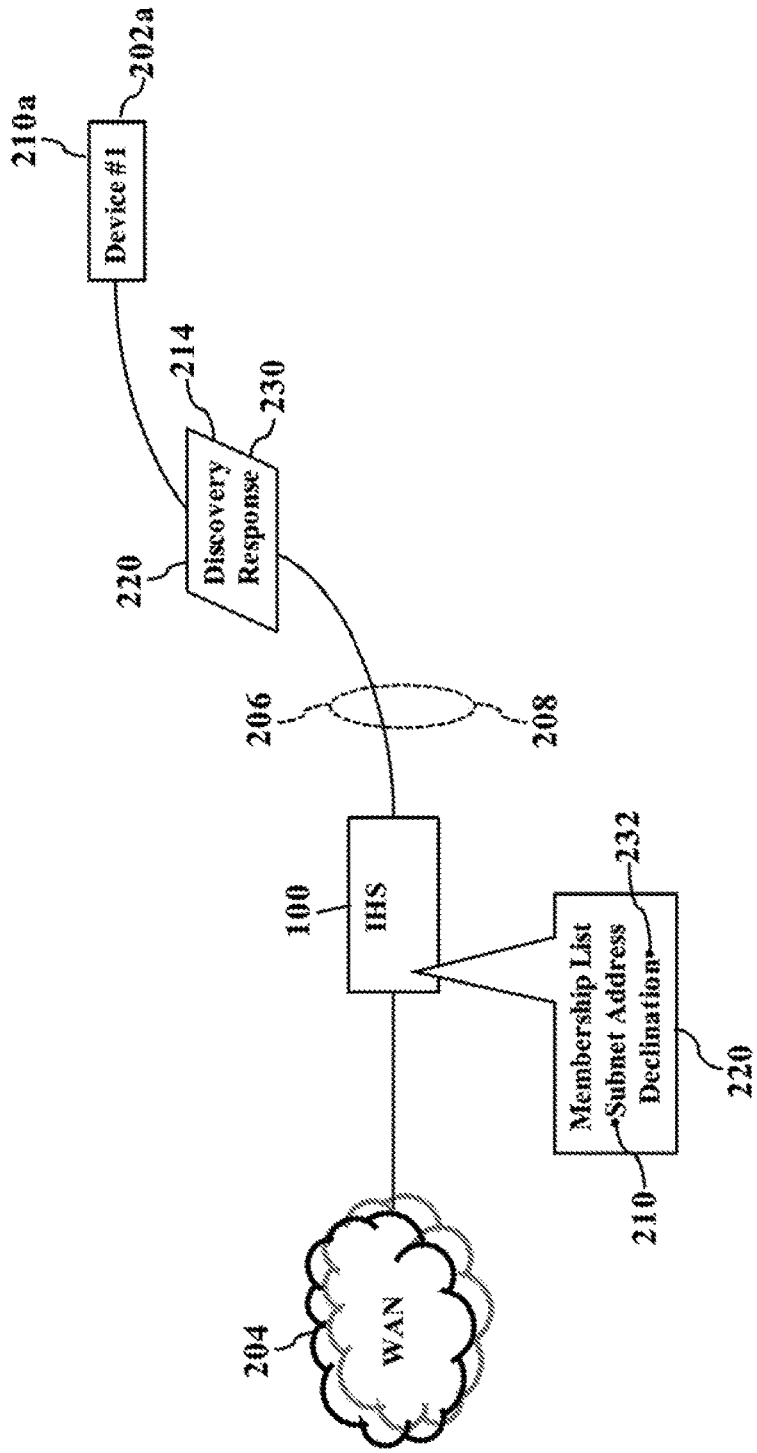

As FIG. 4 illustrates, the information handling system 100 generates a discovery response 230. Again, conventionally the information handling system 100 would multicast messages into the subnet 208 to determine which networked devices 210 confirm the protocol 214 or the service 216. Here, though, the information handling system 100 may generate a declination 232 of multicasting in response to retrieval of the membership list 220 associated with the protocol 214 or the service 216. That is, exemplary embodiments may intentionally and formally instruct the information handling system 100 to decline multicasting into the subnet 208. Exemplary embodiments, instead, may send the membership list 220 as the discovery response 230 to the discovery request 212 (illustrated in FIG. 3). The discovery response 230 may thus identify the subnet addresses 210 associated with the networked devices 202 that are known to accept or respond to the REDFISH® protocol 214.

Figure 5:
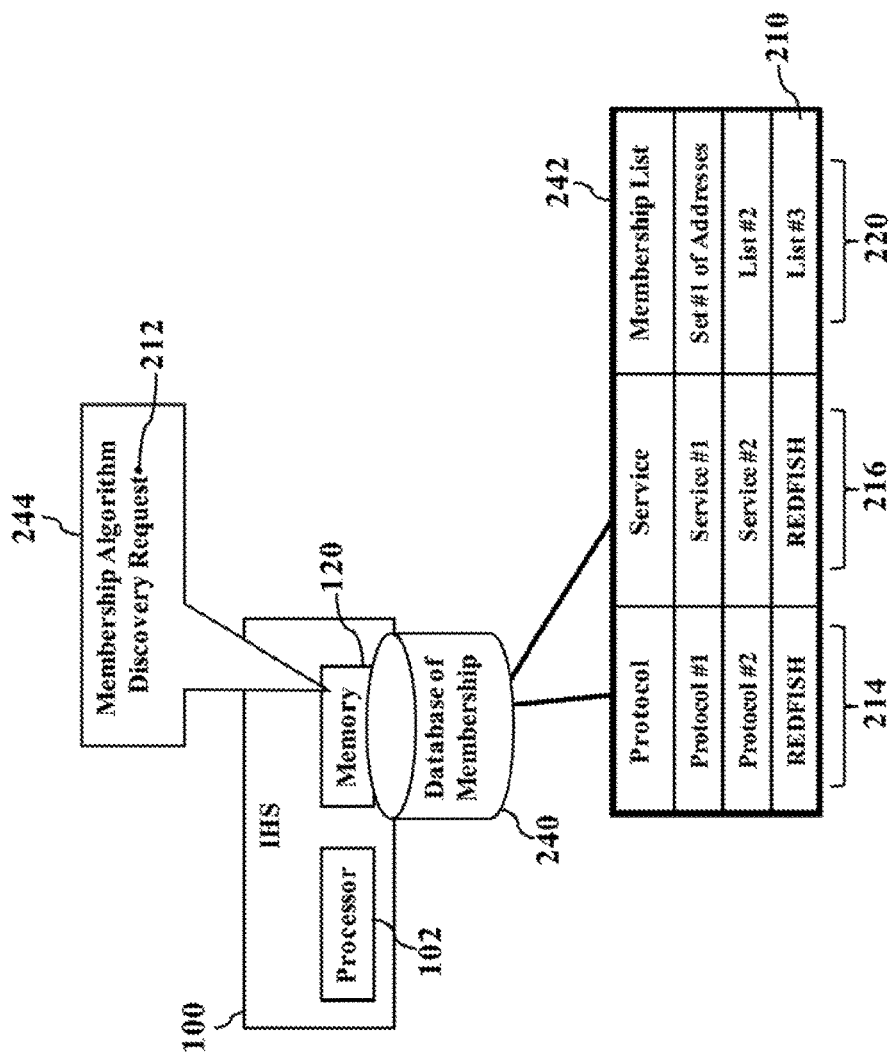

FIG. 5 illustrates an electronic database 240 of membership. When the information handling system 100 receives the discovery request 212, the information handling system 100 may query the electronic database 240 of membership for the protocol 214 and/or the service 216 specified by the discovery request 212. For simplicity, FIG. 5 illustrates the electronic database 240 of membership as a table 242 that electronically maps, relates, or associates different protocols 214 and/or different services 216 to different membership lists 220. The information handling system 100 has the processor 102 (such as "µP", application specific integrated circuit (ASIC), or other component that executes a software membership algorithm 244 stored in the local memory 120. The membership algorithm 244 instructs the processor 102 to perform operations, such as inspecting the discovery request 212 for the protocol 214 and/or the service 216 and querying the electronic database 240 of membership to retrieve the corresponding membership list 220. The electronic database 240 of membership may thus be populated with entries that electronically associate any specification or standard to the corresponding membership list 220. While FIG. 5 only illustrates a few row/column entries, in practice the electronic database 240 of membership may contain many entries for hundreds or even thousands of services, schemes, resources, and standards.

Exemplary embodiments thus present an elegant solution. The membership list 220 identifies clients, receivers, and/or Internet Protocol addresses associated with the corresponding protocol 214 and/or service 216. The information handling system 100 may thus perform a database lookup to discover the corresponding subnet addresses 210 without multicasting messages throughout the subnet 208. Exemplary embodiments, for example, may quickly and simply identify the corresponding subnet addresses 210 associated with the REDFISH® protocol 214. The information handling system 100 may thus formally decline conventional multicasting schemes, thus greatly reducing packet traffic in the subnet 208. Network delay is also reduced, and video and audio streams are not degraded.

Exemplary embodiments may packetize. The information handling system 100 has one or more of the network interfaces 180 (illustrated in FIG. 1) to the wide area network (WAN) 204, such as the Internet. The information handling system 100 may also have the network interface 180 to the local area network (LAN) 206 (or the subnet 208). The network interface 180 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Figure 6:
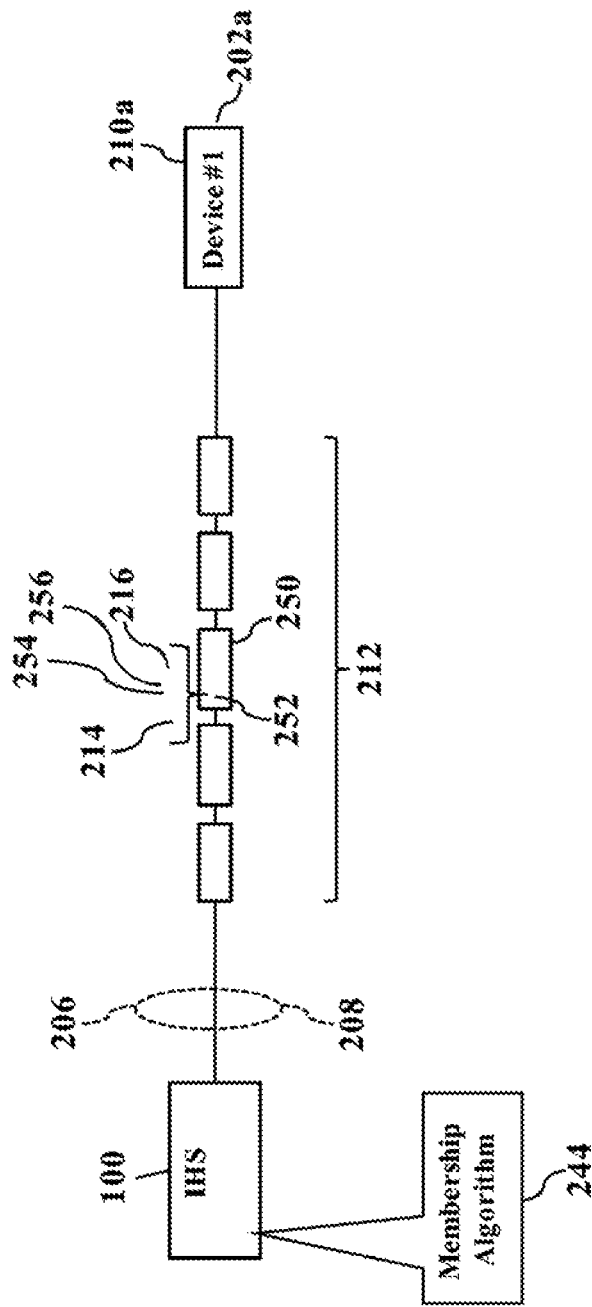
FIG. 6 illustrates a discovery request, according to exemplary embodiments.

FIG. 6 is a more detailed illustration of the discovery request 212, according to exemplary embodiments. FIG. 6, for simplicity, illustrates the discovery request 212 originating from the device 202a communicating via the local area network (LAN) 206 (or the subnet 208) with the information handling system 100. When the information handling system 100 receives the discovery request 212, the membership algorithm 244 causes the information handling system 100 to inspect the discovery request 212 for the protocol 214 and/or service 216. The discovery request 212 is packetized into packets 250 of data, and a header portion 252 of an individual packet 250 includes data or information that corresponds to the protocol 214 and/or service 216. Again, for simplicity, assume the header portion 252 contains bits of information that identify the REDFISH® protocol 214. The discovery request 212, in other words, seeks to discover other devices that respond to the REDFISH® scheme or service.

Exemplary embodiments may also obtain a hop limit 254. The hop limit 254 is also specified in a data field 256 in the header portion 252 of the individual packet 250. The membership algorithm 244 causes the information handling system 100 to inspect the header portion 252 for the bit/byte value associated with the hop limit 254. As those of ordinary skill understand, the hop limit 254 in the IPv6 protocol defines a life associated with the individual packet 250. The information handling system 100 reads the hop limit 254 and forwards the corresponding packet 250, according to the value associated with the hop limit 254. For example, exemplary embodiments may define the hop limit 254 to confine the discovery request 212 to the local area network 206 established by the information handling system 100. According to the IPv6 protocol, when the hop limit 254 (or the time-to-live or "TTL" in the IPv4 protocol) is fixed at one (1), the corresponding packet 250 is restricted to the subnet 208 established by the information handling system 100. The information handling system 100, in other words, may be prohibited from forwarding the packet 250 upstream into the wide area network (illustrated as reference numeral 204 in FIGS. 2-4). The discovery request 212 thus requests that the information handling system 100 multicast discover other locally networked devices that respond to the REDFISH® scheme or service.

Figure 7:
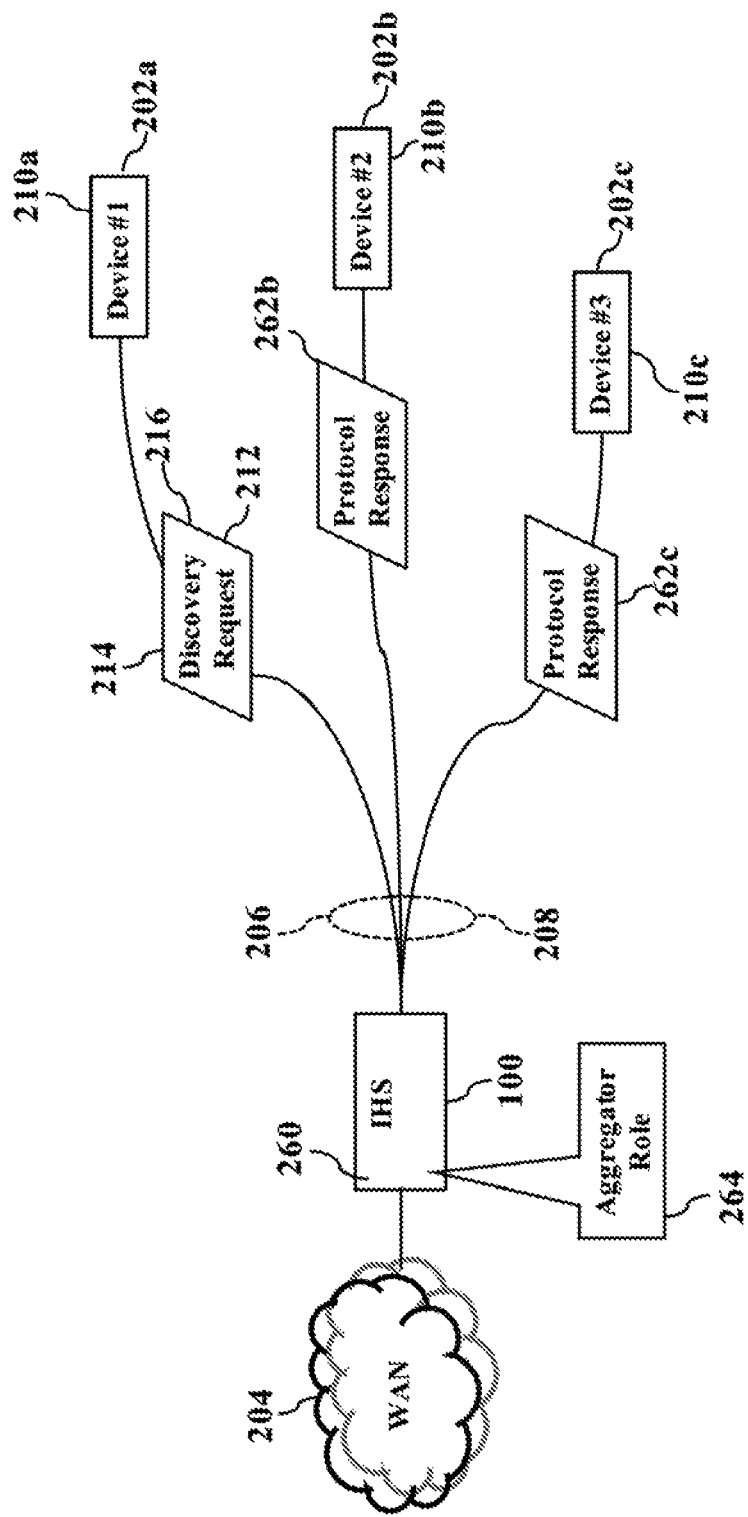
FIGS. 7-8 illustrate aggregated responses, according to exemplary embodiments.
Figure 8:
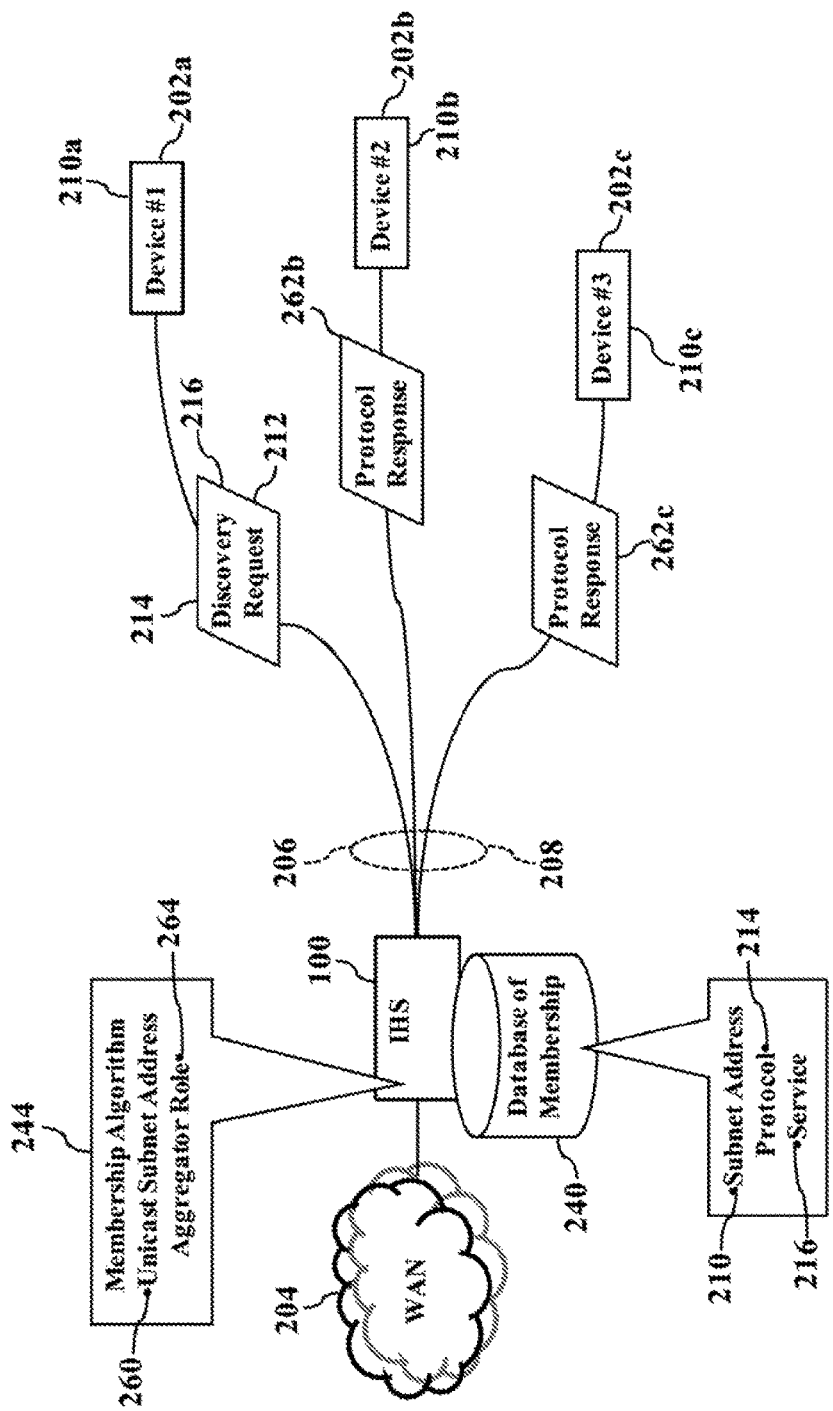

FIGS. 7-8 illustrate aggregated responses, according to exemplary embodiments. When the information handling system 100 receives the discovery request 212, the information handling system 100 may first determine which networked devices in the subnet 208 conform to the protocol 214 and/or service 216 (again, such as the REDFISH® scheme or service). The information handling system 100 may thus initially multicast the discovery request 212 to all the devices (illustrated as 202a-c) associated with the subnet addresses 210a-c communicating via the local area network 206 (such as the subnet 208). The discovery request 212 may thus be broadcast via physical cables and/or via a wireless interface (such as WI-FI®, near field, and/or BLUETOOTH®). The discovery request 212 also specifies a unicast subnet address 260 assigned to the information handling system 100. The information handling system 100 thus listens for protocol responses 262 sent from any of the devices 202 in the subnet 208.

The information handling system 100 assumes an aggregator role 264. Each protocol response 262 is sent to the unicast subnet address 260 assigned to, or assumed by, the information handling system 100. Each protocol response 262 confirms that the corresponding endpoint device (such as networked devices 202b and 202c) subscribes to or understands the protocol 214 and/or the service 216 specified by the discovery request 212 (again, such as the REDFISH® scheme or service). Each protocol response 262 is sent to the unicast subnet address 260 associated with the aggregator role 264, thus causing the information handling system 100 to aggregate all the protocol responses 262 generated within the subnet 208. Each confirming endpoint device (such as 202b and 202c), for example, advertises itself as REDFISH® compliant by sending an HTTP request that specifies a service tag and a uniform resource locator associated with a REDFISH® root website, as required or defined by the REDFISH® specification. The uniform resource locator refers to a particular resource that is directly accessed via the service entry point. This resource serves as the starting point for locating and accessing the other resources and associated metadata that together make up an instance of a REDFISH® service.

FIG. 8 illustrates the electronic database 240 of membership. As the information handling system 100 collects the protocol responses 262, the information handling system 100 may then populate the electronic database 240 of membership. Exemplary embodiments add entries to the electronic database 240 of membership that electronically associate the subnet addresses 210 that confirm the protocol 214. The electronic database 240 of membership, for example, logs the protocol responses 262 that respond to the REDFISH® scheme or service. When the information handling system 100 receives any protocol response 262, the membership algorithm 244 causes the information handling system 100 to inspect the packets for the subnet address 210 identifying the networked device 202 confirming the protocol 214. The membership algorithm 244 causes the information handling system 100 to add an entry that associates the subnet address 210 to the protocol 214 and/or to the service 216 (as FIG. 5 also illustrates). The electronic database 240 of membership thus maintains an accurate inventory or view of the neighboring networked devices 202 and their corresponding protocol 214 or service 216 capabilities.

Figure 9:
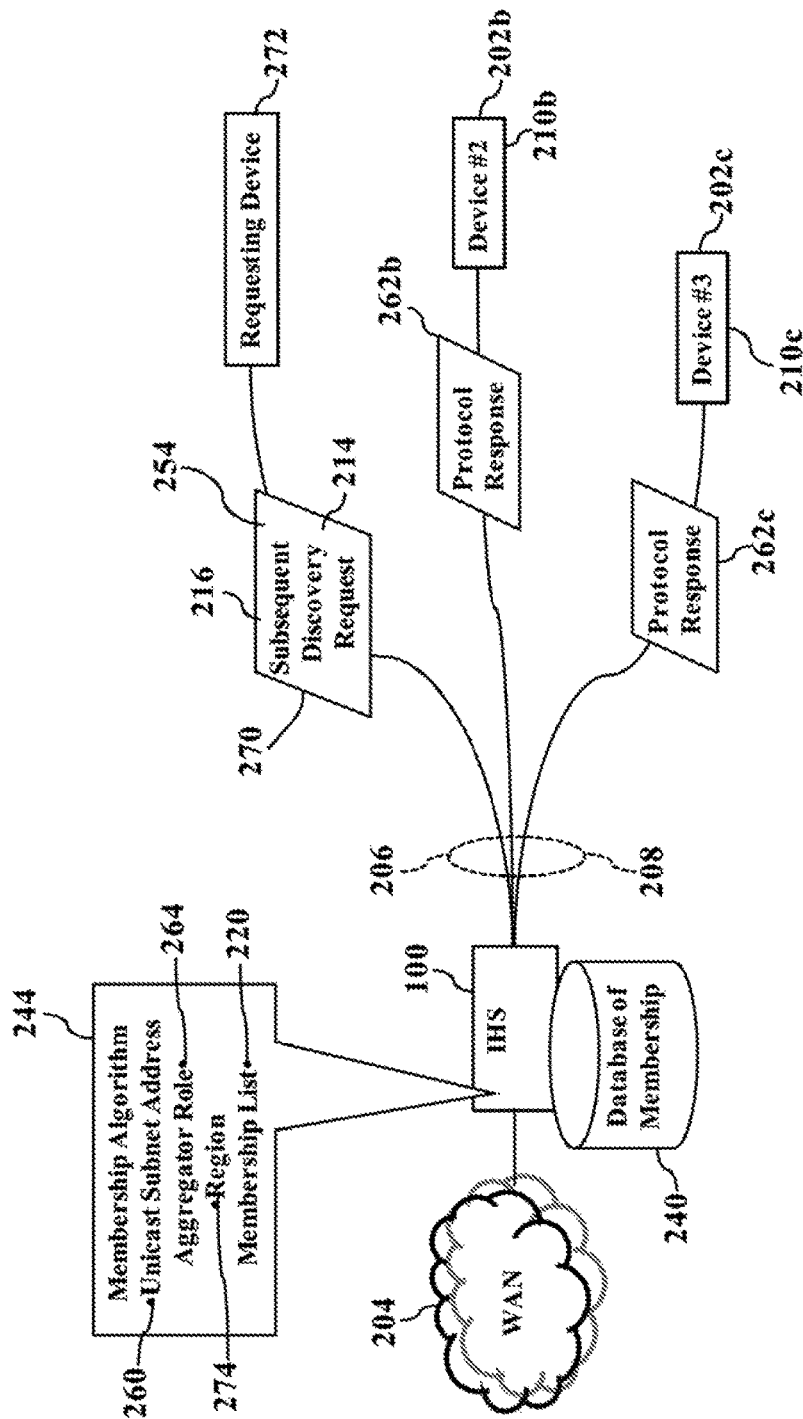
FIGS. 9-11 illustrate an aggregator role, according to exemplary embodiments.
Figure 10:
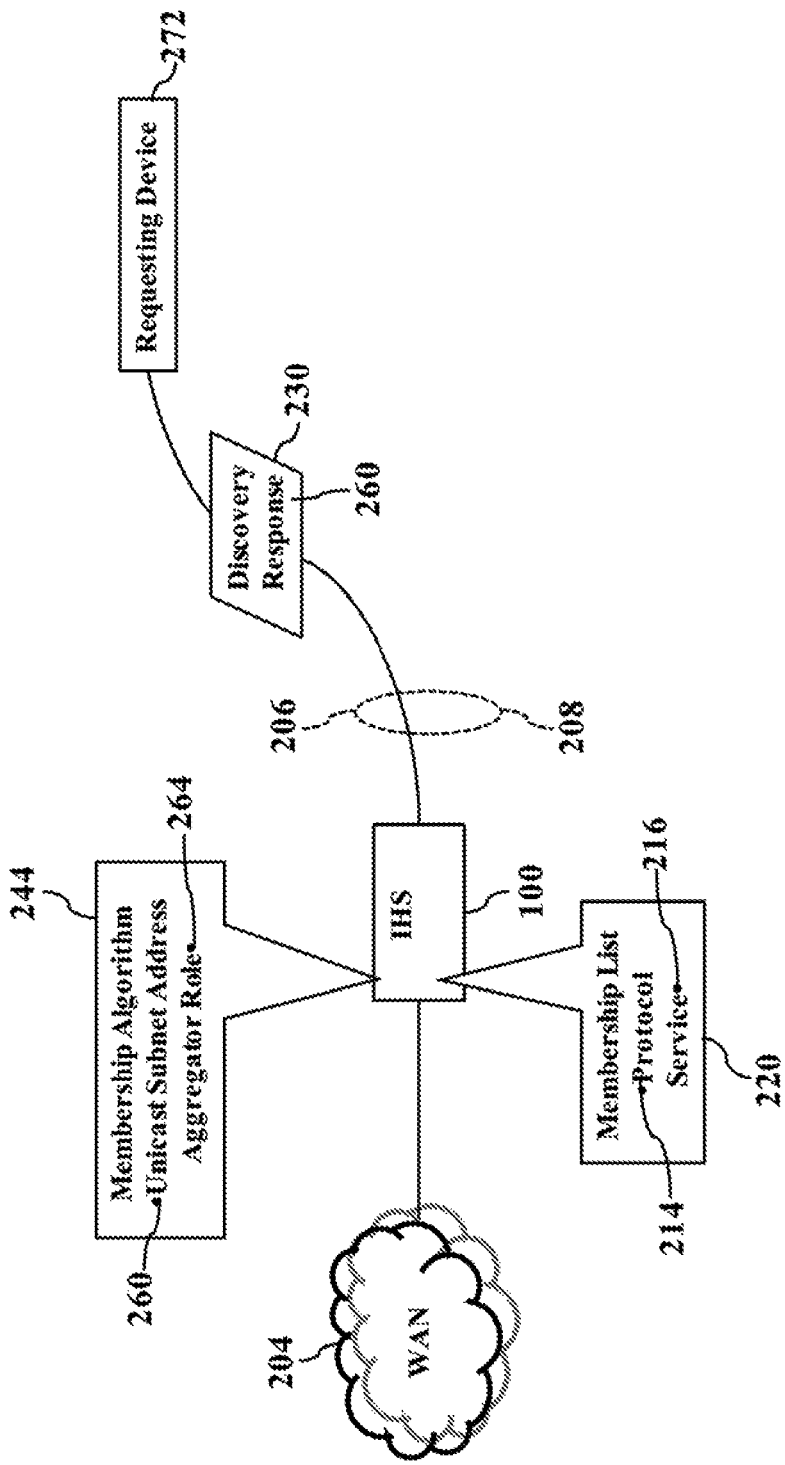
Figure 11:
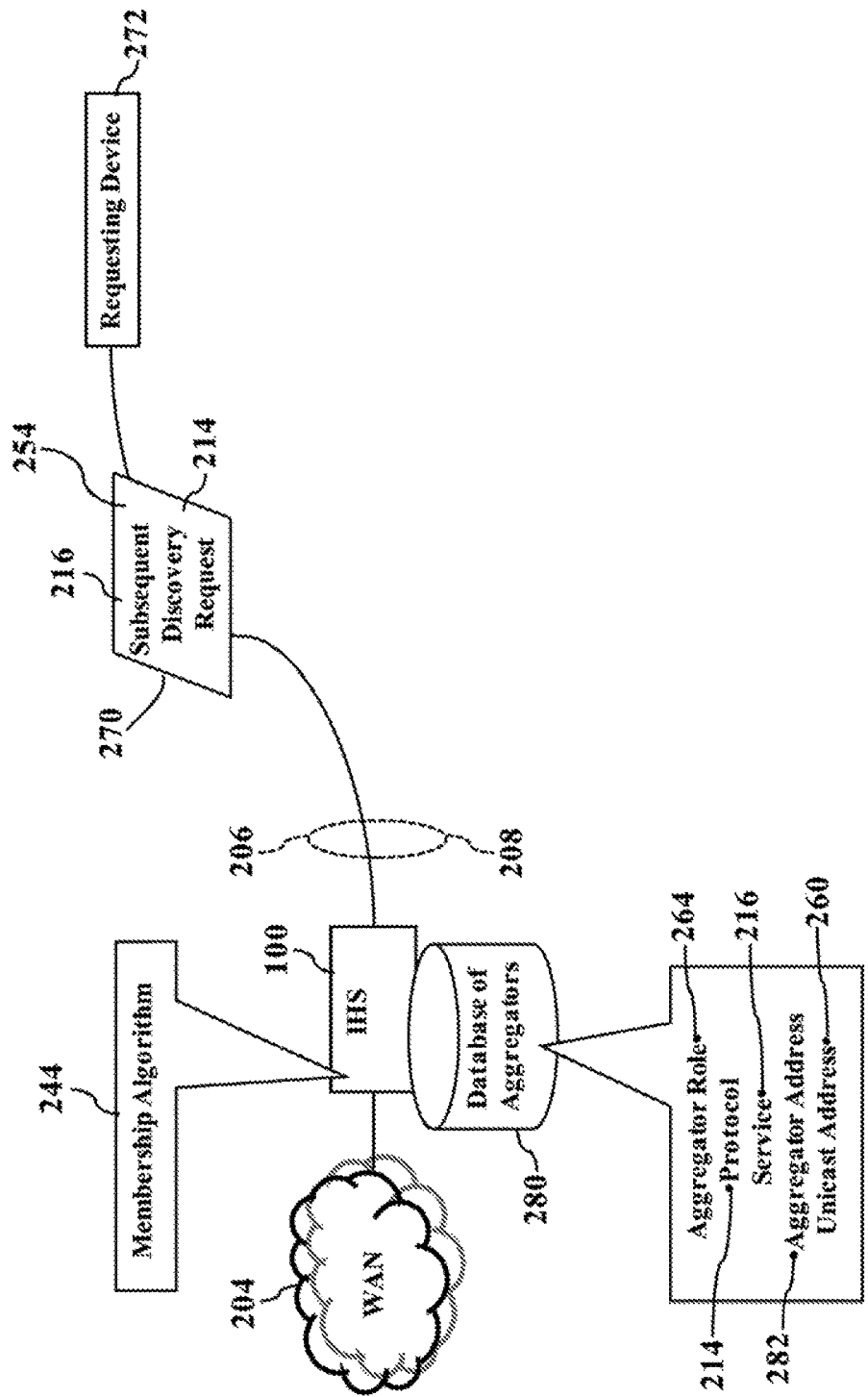

FIGS. 9-11 further illustrate the aggregator role 264, according to exemplary embodiments. Once membership is determined in the subnet 208, workflow/messaging reductions may be implemented that reduce network traffic and that increase network performance. Suppose that the information handling system 100 receives a subsequent discovery request 270. That is, once the electronic database 240 of membership is configured and operational, future queries or requests (such as the subsequent discovery request 270) may have abbreviated processing that foregoes multicasting. Suppose the subsequent discovery request 270 again specifies the protocol 214 and/or the service 216. The subsequent discovery request 270 is sent from a requesting device 272. FIG. 9 illustrates the requesting device 272 communicating with the information handling system 100 via the local area network 206 (such as the subnet 208). The requesting device 272, though, may alternatively operate within the wide area network 204 (such as the Internet). Regardless, suppose also that the subsequent discovery request 270 has the hop limit 254 set to a relatively high value to ensure multicasting. For example, assume the subsequent discovery request 270 has the hop limit 254 set to sixty four (64). The hop limit 254 of sixty four (64) would ordinarily instruct the information handling system 100 to multicast the subsequent discovery request 270 within a geographic region 274. The information handling system 100, in other words, would conventionally multicast the subsequent discovery request 270 into both the local area network 206 (or the subnet 208) and upstream into the wide area network 204 (such as the Internet).

Here, though, the subsequent discovery request 270 may only be routed to the aggregators. That is, once the electronic database 240 of membership is configured, broadcast multicasting may be denied or declined. The subsequent discovery request 270 may only be received by network elements having the aggregator role 264. So, when the information handling system 100 receives the subsequent discovery request 270, the information handling system 100 need only consult the electronic database 240 of membership for the protocol 214. The information handling system 100 may thus quickly retrieve the corresponding membership list 220 without propagating messages into the local area network 206 (or the subnet 208). Even though the hop limit 254 was regional, exemplary embodiments overrode that regional designation and declined multicasting. Exemplary embodiments, instead, may merely consult the stored membership list 220 for the protocol neighbors. Exemplary embodiments thus quickly and simply determine the neighboring member devices 202 without inserting a broadcast storm that clogs the subnet 208 and degrades performance.

As FIG. 10 illustrates, the aggregator may identify itself. When the information handling system 100 receives the subsequent discovery request 270 (as FIG. 9 illustrated), the membership algorithm 242 may cause the information handling system 100 to generate the discovery response 230. Here, though, the discovery response 230 may specify the unicast subnet address 260 associated with the information handling system 100 having the aggregator role 264. Moreover, according to the REDFISH® schema, the discovery response 230 would also self-identify itself as a service endpoint. The discovery response 230, in other words, is sent to the Internet Protocol address associated with the requesting device 272, and the discovery response 230 identifies the information handling system 100 as a REDFISH® service endpoint.

The information handling system 100 may thus be an aggregator for all REDFISH® queries. Once the information handling system 100 sends the discovery response 230 specifying itself as the aggregator role 264, all future REDFISH® queries route to the unicast subnet address 260 associated with the information handling system 100. The information handling system 100 may thus merely respond with the membership list 220 previously defined for the REDFISH® protocol 214 or service 216.

FIG. 11 illustrates additional aggregators. Here exemplary embodiments may quickly and easily locate other aggregators. Recall that the subsequent discovery request 270 set the hop limit 254 to ensure regional broadcast (such as 64). Such a large hop limit 254 could also conventionally cause the information handling system 100 to multicast messages upstream into the wide area network 204 (such as the Internet) to discover additional REDFISH® endpoints. These messages increase packet traffic and burden performance.

As FIG. 11 illustrates, though, exemplary embodiments may only disperse messages to other aggregators. Even though the subsequent discovery request 270 had the hop limit 254 set for regional broadcast (such as 64), here the information handling system 100 may selectively disperse the subsequent discovery request 270 only to other network elements having the aggregator role 264 for the same protocol 214 or service 216. When the information handling system 100 receives the subsequent discovery request 270, here the membership algorithm 242 may cause the information handling system 100 to query an electronic database 280 of aggregators. The electronic database 280 of aggregators is populated with entries that electronically associate the different protocols 214 and/or different services 216 to different aggregator addresses 282. The electronic database 280 of aggregators, in simple words, may store the Internet Protocol unicast addresses 260 assigned to other network elements having the same aggregator role 264 for the same protocol 214 and/or service 216. The information handling system 100 merely queries the electronic database 280 of aggregators for the protocol 214, the service 216, and/or the aggregator role 264. The information handling system 100 retrieves the corresponding unicast network addresses 260 for other network elements having the same protocol 214, the service 216, and/or the aggregator role 264. So, instead of broadcast storming messages into the wide area network 204 to discover additional REDFISH® endpoints, exemplary embodiments may target messages to the other aggregators associated with the same aggregator role 264. Exemplary embodiments may thus target service-level messages with greatly reduced packet traffic.

Figure 12:
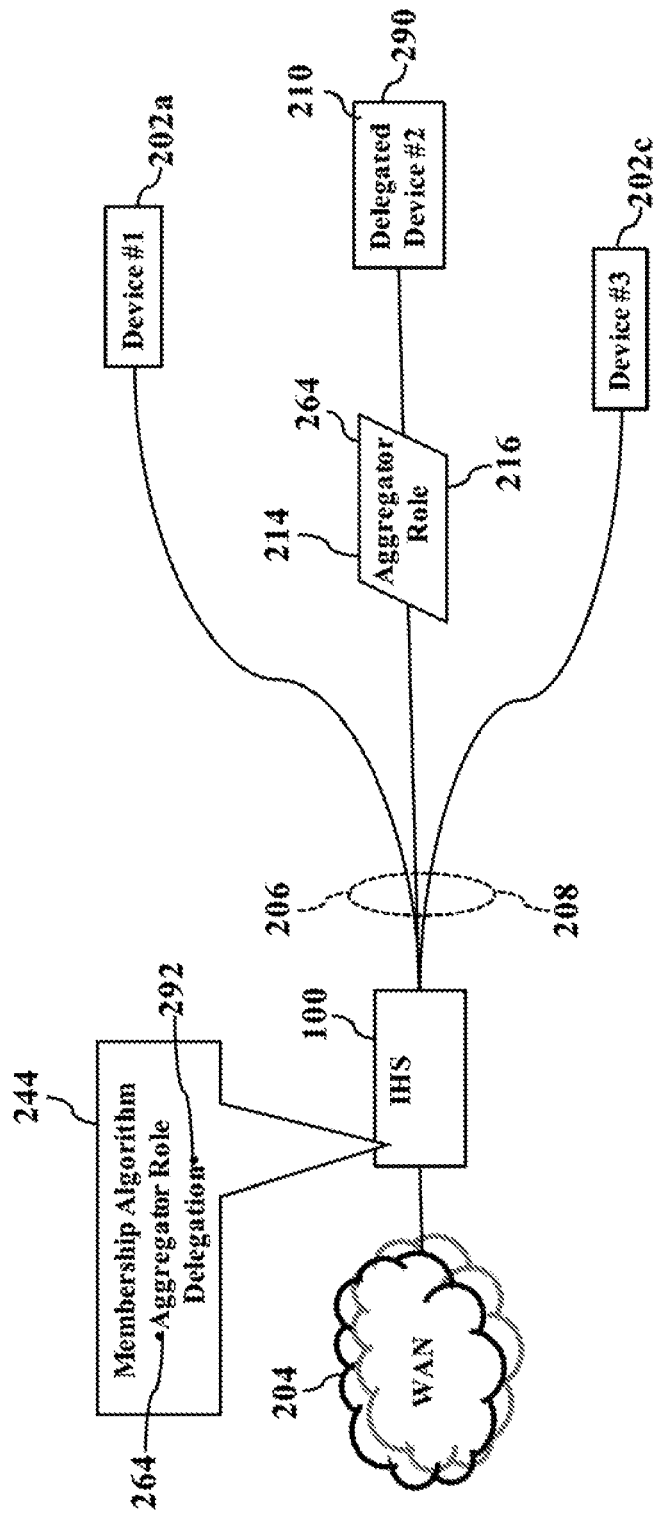
FIG. 12 illustrates delegation of the aggregator role, according to exemplary embodiments.

FIG. 12 illustrates delegation of the aggregator role 264, according to exemplary embodiments. Here the aggregator role 264 may be passed, or delegated, to another network element. There may be conditions or times in which the aggregator role 264 is best transferred or moved to a different device. The information handling system 100, for example, may be busy or queued with a task, or the information handling system 100 may be experiencing a malfunction or error. Regardless, exemplary embodiments may delegate the aggregator role 264 to another networked element. FIG. 12, for simplicity, illustrates the aggregator role 264 passing to a delegated device 290 communicating with the information handling system 100 via the subnet 208. The delegated device 290 may be chosen according to a rule of succession or by self-nomination. Whenever the membership algorithm 244 determines that a delegation 292 should occur, the aggregator role 264 may pass to the delegated device 290. The delegated device 290 may then advertise its subnet address 210 as the aggregator role 264 for the particular protocol 214 or service 216 (such as a REDFISH® service endpoint for the REDFISH® schema). The delegation 292 may continue until a revocation by the information handling system 100.

Figure 13:
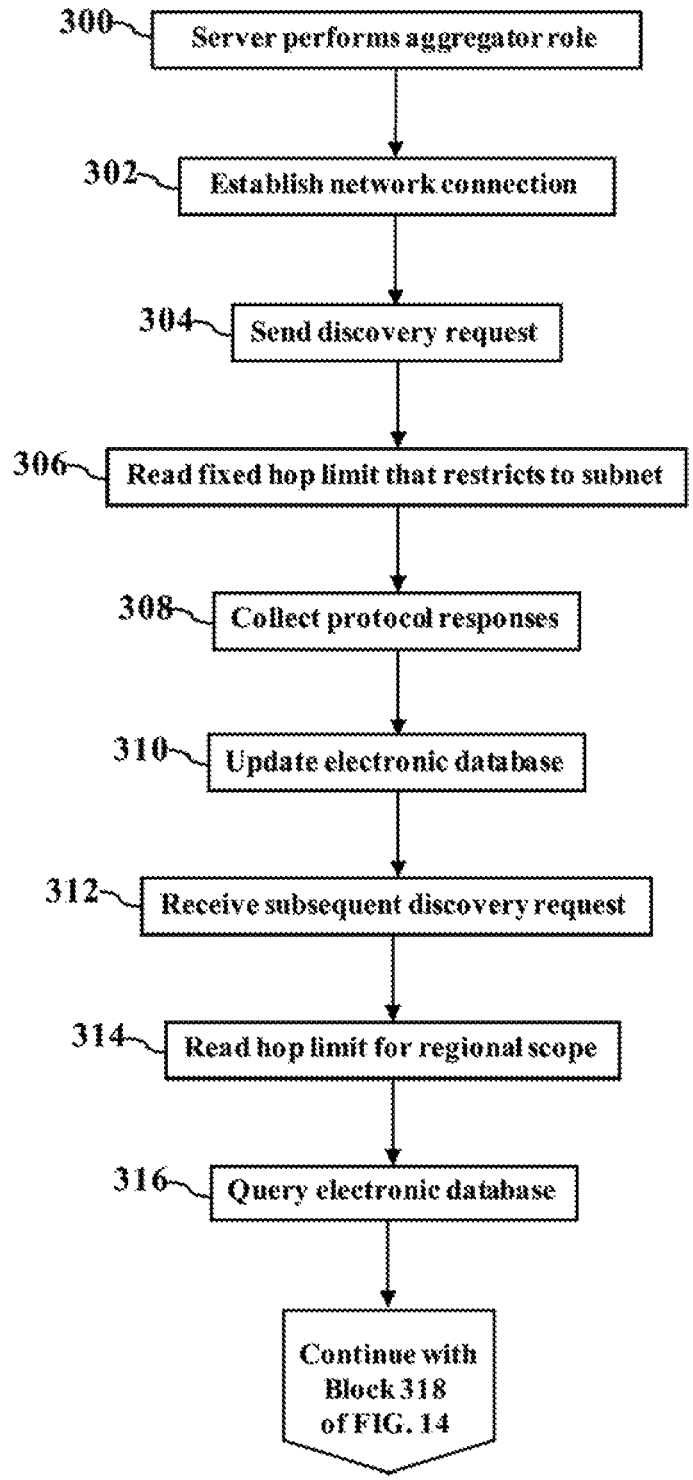
FIGS. 13 and 14 are flowcharts illustrating a method or algorithm for service discovery, according to exemplary embodiments.
Figure 14:
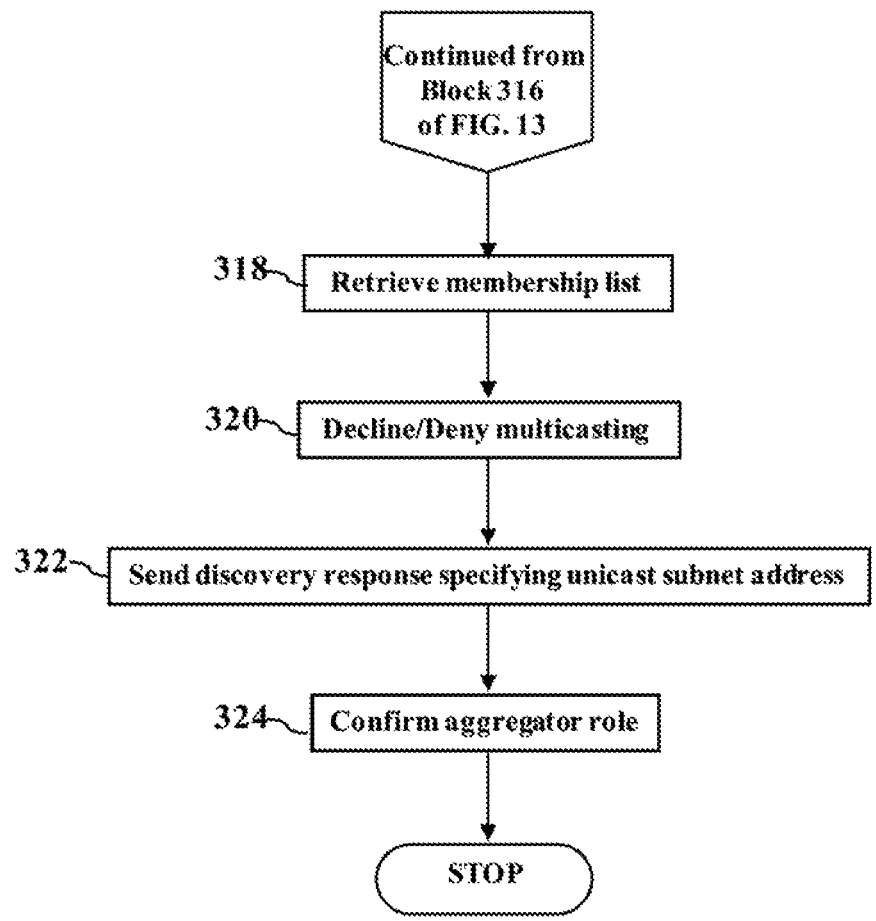

FIGS. 13-14 are flowcharts illustrating a method or algorithm for service discovery, according to exemplary embodiments. Here the information handling system 100 is explained as a server performing the aggregator role 264 (Block 300). The server, for example, has an integrated DELL® Remote Access Controller (iDRAC) for remote management and configuration, which is known and need not be explained in detail. Moreover, as this explanation is similar to that illustrated in FIGS. 1-12, the similarities need only be briefly mentioned. For example, when the iDRAC establishes a network connection (Block 302) with the local area network 206 and/or the wide area network 204, the server may wait a random time (such as seconds or minutes) and send the discovery request 212 (Block 304). Here again the discovery request 212 may specify the REDFISH® protocol 214, but any protocol 214 or service 216 may be specified. The discovery request 212 may have the hop limit 254 fixed to the value of one (1) (Block 306) to ensure that the discovery request 212 never crosses or exits the local subnet 208 (such as that established by the network switch 200). The server then listens for the protocol responses 262 (Block 308), thus assuming the aggregator role 264 for all REDFISH® services in the purview of the network switch 200. Each REDFISH® end point responds to the unicast subnet address 260, thus advertising itself as REDFISH® compliant by sending an HTTP request that specifies the service tag and the uniform resource locator associated with a REDFISH® root website. As the server collects the protocol responses 262, the server updates the electronic database 240 of membership (Block 310). When the server receives the subsequent REDFISH® discovery request (Block 312), the hop limit 254 may restrict multicasting within the geographic region 274 (Block 314). However, the server may, instead, query the electronic database 240 of membership (Block 316).

The flowchart continues with FIG. 14. Even though the hop limit 254 permitted regional scope (see Block 314 of FIG. 12), the server, instead, queried the electronic database 240 of membership to retrieve the corresponding membership list 220 (Block 318). The server thus declines or denies multicasting (Block 320) according to the aggregator role 264. The server sends the discovery response 230 specifying its unicast subnet address 260 (Block 322), thus self-identifying itself as a REDFISH® service endpoint. The server thus confirms the aggregator role 264 for all REDFISH® queries (Block 324).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
    receiving, by a server, a discovery request sent via the Internet from a requesting device, the discovery request specifying a protocol associated with a service, and the discovery request requesting a multicast to devices networked to the server via a local area network;
    retrieving, by the server, an electronic membership list in response to the discovery request, the electronic membership list electronically associated with the protocol specified by the discovery request;
    declining, by the server, the multicast of the discovery request to the devices networked via the local area network in response to retrieval of the electronic membership list; and
    sending, by the server, a response to the discovery request, the response sent via the Internet to the requesting device, and the response including the electronic membership list electronically associated with the protocol specified by the discovery request;
    wherein the electronic membership list specifies particular ones of the devices known to confirm the protocol specified by the discovery request.

2. The method of claim 1, further comprising populating the electronic membership list with subnet addresses, each subnet address of the subnet addresses associated with a corresponding one of the devices that is networked to the server via the local area network and that confirms the protocol.

3. The method of claim 1, further comprising querying an electronic database for the protocol specified by the discovery request, the electronic database having electronic database associations between different membership lists and different protocols including the protocol specified by the discovery request.

4. The method of claim 1, further comprising storing subnet addresses listed in the electronic membership list.

5. The method of claim 1, further comprising passing the electronic membership list to a subnet address associated with one of the devices that is networked to the server via the local area network.

6. The method of claim 1, further comprising passing the electronic membership list to one of the devices that is networked to the server via the local area network and that confirms the protocol.

7. The method of claim 1, further comprising passing the electronic membership list to one of the devices that is networked to the server via the local area network.

8. An information handling system, comprising:
 a processor; and
 a memory device accessible to the processor, the memory device storing instructions that when executed cause the processor to perform operations, the operations comprising:
 receiving a discovery request sent via the Internet from a requesting device, the discovery request specifying a protocol associated with a service, and the discovery request requesting a multicast to devices networked via a local area network;
 retrieving an electronic membership list in response to the discovery request, the electronic membership list electronically associated with the protocol specified by the discovery request;
 declining the multicast of the discovery request to the devices networked via the local area network in response to retrieval of the electronic membership list; and
 sending a response to the discovery request via the Internet to the requesting device, the response including the electronic membership list that is electronically associated with the protocol specified by the discovery request.

9. The system of claim 8, wherein the operations further comprise populating the electronic membership list with subnet addresses, each subnet address of the subnet addresses associated with a corresponding one of the devices that is networked via the local area network and that confirms the protocol.

10. The system of claim 8, wherein the operations further comprise querying an electronic database for the protocol specified by the discovery request, the electronic database having electronic database associations between different electronic membership lists and different protocols including the protocol specified by the discovery request.

11. The system of claim 8, wherein the operations further comprise storing subnet addresses listed in the electronic membership list.

12. The system of claim 8, wherein the operations further comprise passing the electronic membership list to a subnet address associated with one of the devices that is networked via the local area network.

13. The system of claim 8, wherein the operations further comprise passing the electronic membership list to one of the devices that is networked via the local area network and that confirms the protocol.

14. The system of claim 8, wherein the operations further comprise passing the electronic membership list to one of the devices that is networked via the local area network.

15. A memory device storing instructions that when executed cause a processor to perform operations, the operations comprising:
 receiving a discovery request sent via the Internet from a requesting device, the discovery request specifying a protocol associated with a service, and the discovery request requesting a multicast to devices networked via a local area network;
 retrieving an electronic membership list in response to the discovery request, the electronic membership list electronically associated with the protocol specified by the discovery request;
 declining the multicast of the discovery request to the devices networked via the local area network in response to retrieval of the electronic membership list; and
 sending a response to the discovery request via the Internet to the requesting device, the response comprising the electronic membership list that is electronically associated with the protocol specified by the discovery request.

16. The memory device of claim 15, wherein the operations further comprise populating the electronic membership list with subnet addresses, each subnet address of the subnet addresses associated with a corresponding one of the devices that is networked via the local area network and that confirms the protocol.

17. The memory device of claim 15, wherein the operations further comprise querying an electronic database for the protocol specified by the discovery request, the electronic database having electronic database associations between different electronic membership lists and different protocols including the protocol specified by the discovery request.

18. The memory device of claim 15, wherein the operations further comprise storing subnet addresses listed in the electronic membership list.

19. The memory device of claim 15, wherein the operations further comprise passing the electronic membership list to a subnet address associated with one of the devices that is networked via the local area network.

20. The memory device of claim 15, wherein the operations further comprise passing the electronic membership list to one of the devices that is networked via the local area network.

* * * * *